United States Patent Office 3,133,976
Patented May 19, 1964

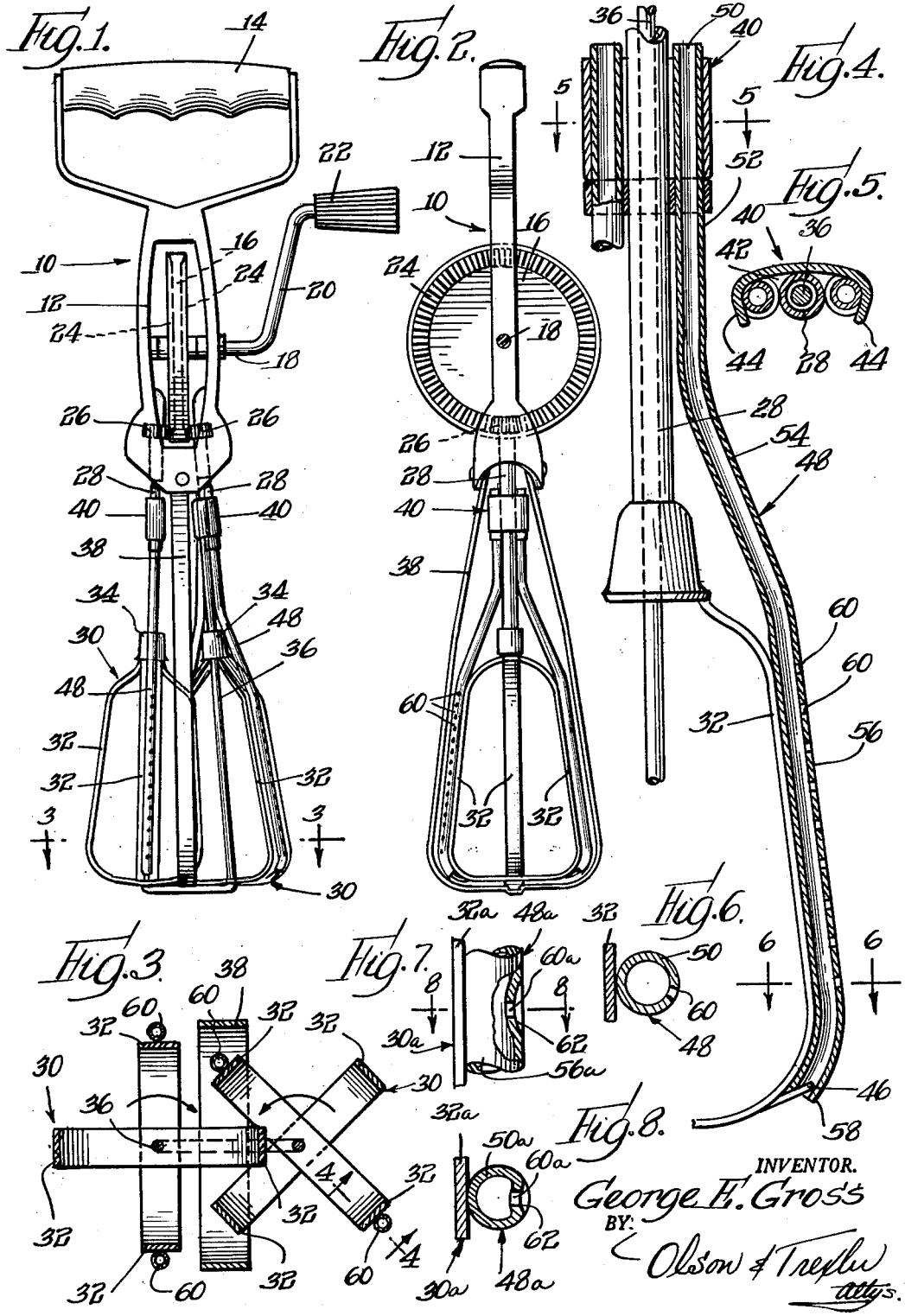

3,133,976
AERATOR BEATER
George E. Gross, Skokie, Ill.
(8 S. Rueter, Arlington Heights, Ill.)
Filed June 30, 1960, Ser. No. 40,056
6 Claims. (Cl. 261—32)

This invention relates to improvements in food mixers, particularly of the type commonly spoken of as egg beaters.

Food mixers of the type frequently spoken of as egg beaters are well known in the art, and comprise a plurality of blades which are driven through a gear arrangement operated by a hand crank, or which are motor driven. Such beaters are used for beating or mixing a great variety of foodstuffs in the kitchen, including eggs, cake mixes, and the like. Such beaters agitate the surface of an item to be beaten to form bubbles at the surface. These bubbles then are broken up and are pulled down into the fluid mixture. When the beating is stopped, there are bubbles of all sizes dispersed through the mixture. This disparity of bubble size results in non-uniform texture of the beaten material, and this is undesirable in the case of cakes and the like. The length of time for beating various mixtures can be quite extended, and in the case of hand operated beaters this can be very tedious.

Accordingly, it is an object of this invention to produce a food mixer that will beat or mix foodstuffs in a manner more efficacious than any prior food mixer, particularly reducing the time required for beating, and producing a more uniform texture.

Furthermore, it is an object of this invention to provide a food mixer or beater which introduces bubbles into the inside of the mix or the like being beaten, rather than at the surface thereof.

More specifically, it is an object of this invention to provide a food mixer or beater which introduces air into the foodstuff being beaten by means of Bernoulli's principle.

Other and further objects and advantages of the present invention will be apparent from the following description when taken in connection with the accompanying drawings wherein:

FIG. 1 is a front elevational view of a food mixer constructed in accordance with the principles of this invention;

FIG. 2 is a side elevational view thereof;

FIG. 3 is a horizontal sectional view taken along the line 3—3 in FIG. 1, and on a slightly enlarged scale;

FIG. 4 is an enlarged vertical sectional view taken along the line 4—4 in FIG. 3;

FIG. 5 is a horizontal sectional view taken along the line 5—5 in FIG. 4;

FIG. 6 is a horizontal sectional view taken along the line 6—6 in FIG. 4;

FIG. 7 is a fragmentary side view with a part broken away of a modification of the air distributing means; and FIG. 8 is a horizontal sectional view as taken along the line 8—8 in FIG. 7.

Referring now in greater particularity to the drawings, there will be seen a food mixer 10. The food mixer is of generally conventional design, and a hand operated mixer or beater has been chosen as exemplary, although it will be understood that the principles of the invention apply equally well to motor driven mixers or beaters.

The beater 10 comprises a frame 12, which conveniently is of cast metal construction, and which has at the top, a handle or hand grip 14, which may be a separate part formed of some convenient and comfortable material, plastic being exemplary. The frame 12 is open at the center, and a large gear 16 is journalled therein on a shaft 18 having a crank 20 formed integral therewith and bearing a rotatable handle 22. The handle 22 conveniently is made of plastic, and is knurled or ridged for ready gripping by the fingers.

The gear 16 is formed with crown or face teeth 24 peripherally about both faces thereof. This gear meshes with and drives a pair of gears 26, which conveniently are of plastic construction. Each gear 26 is fixed to and drives a sleeve 28 on which the beaters or impellers 30 are mounted. The beaters 30 each comprise four blades 32, although there may be more or less than this number. The blades are arranged in integral pairs of more or less U-shaped construction having the upper ends thereof deflected in and secured within caps 34 fixed on the sleeves 28. Axles on which the beaters 30 and sleeves 28 rotate are provided by the legs of a U-shaped wire 36 having the upper ends thereof secured in the frame 12 above the gears 26. The bight of the wire 36 is braced by a generally U-shaped section of sheet metal 38 having the upper ends thereof secured to the frame 12.

The food mixer as heretofore shown and described is entirely conventional in construction, and substantially any other conventional mixer can be substituted therefor in this disclosure. The description which ensues hereinafter is of the novel parts of the beater.

Specifically, each of the two sleeves 28 has affixed thereto just below the frame 12 a resilient clip 40 (FIGS. 1, 2, 4 and 5 by means such as brazing or soldering as indicated at 42. Each clip 40 has a pair of oppositely disposed wings or retaining sections 44. At the curved bottom corner of each beater blade 32 there is provided a finger 46 which is oriented upwards and outwards. The fingers 46 can be extra parts soldered or brazed to the blade, but most conveniently are simply fingers struck from the sheet metal of the blades 32.

The fingers 46 are provided only on blades 32 which are aligned with the wings or retaining sections 44 of the clips 40. That is, there are only two such fingers for each beater, in the illustrative example of the invention. As will be understood, there could be four, if so desired, and it will be understood that the clip 40 would then be of a nature having four retaining sections respectively aligned with the fingers 46.

By way of illustration, a pair of tubes 48 is secured to each sleeve 28 and beater 30 by means of the resilient clips 40 and fingers or prongs 46. (There can be up to as many tubes as there are beater blades, and there can be a great many such blades.) Each tube is open at the top as at 50, and is provided with a substantially vertical shank portion 52 running down along the adjacent sleeve 38. The tube then angles diagonally outwardly through a section 54, and then extends downwards in a portion 56 adjacent the blade, having a turned-in lower end 58 receiving one of the fingers or prongs 46. The upper end is held by the appropriate wing or retaining section 44 of the respective clip 40.

The portion 56 of each tube 48 adjacent the blade 32 is provided on the outer portion thereof with a vertical row of small apertures 60. These apertures are disposed generally radially of the beaters 30, but are displaced slightly in a trailing direction relative to the direction of rotation.

The upper ends 50 of the tubes are disposed above the foodstuff being mixed or beaten, while at least some of the apertures 60 are below the surface thereof. The bottom ends 58 of the tubes are substantially closed by the fingers or prongs 46 which hold the tubes in place with a spring action. Hence, upon rotation of the beater by turning of the crank 22, air is aspirated down through the tubes 50 and out through the apertures 60 into the foodstuff or the like being beaten. Thus, bubbles are formed from the inside out, and all of the bubbles are of uniform size, and being fine do not readily rise to the surface.

A modification of the invention is illustrated in FIGS. 7 and 8. In this modification, the parts are generally the same as heretofore shown and described, and similar parts are identified by similar numerals with the addition of the suffix *a*, thus avoiding duplication of description. The distinguishing feature of the embodiment of FIGS. 7 and 8 is that the apertures 60*a* are located radially of the beaters 30*a*, but have depressions or dimples 62 formed about them. In this manner, the tube may aspirate air efficiently into the foodstuff or the like without the necessity of offsetting the apertures in the trailing direction. This has some advantage in that the offset apertures are either to the right or to the left (as viewed from above) according to the direction of rotation of the beaters. This requires that when the beaters are removed from the clips 40 and fingers 46, as for cleaning, that they be reinstalled in the proper position. This is not really a particularly difficult thing to do, and either the clips or the fingers or tabs 46 can be shaped distinctively according to whether they are on right hand or left hand beaters, and the tubes can be shaped complementary thereto.

The tubes 48 provide for uniform aeration of a fluid in which the food mixer is operated. By actual test of a model corresponding to the food mixer disclosed herein, fully fifty percent less time is taken to beat up any premixed material, such as a cake material, than is required by an identical beater without the aerator or aspirator tubes 48. For some reason, it has been found that twenty percent less baking time is required. It is not at the present time fully understood why the baking time is reduced, although it is believed caused by the more uniform bubbles.

A better texture is produced, since the bubbles are uniform in size, as previously explained. A better texture leads to a better taste. It may be that the better taste is purely psychological, resulting from the feel of the texture, but cakes made with the aerator beater or food mixer herein disclosed do taste better. Oddly enough, cakes in which the ingredients have been mixed with the aerator beater or food mixer disclosed herein rise uniformly across the top during baking, rather than crowning at the center, as happens with conventional mixers or beaters.

One-third more volume is produced in egg whites beaten with the present beater. When pancake batter that is not supposed to be beaten is beaten with the present aerator beater or food mixer, better tasting pancakes are produced.

Although mention has been made of food mixing, it will be understood that the mixer or beater herein disclosed is equally useful in whipping or beating eggs, in whipping cream or skim milk toppings, and in foaming various sorts of oils, etc. In fact, the present food mixer or beater can even be used intermittently to aerate minnow buckets, thereby prolonging the life of live bait. The apertures 60 are small enough that most doughs and the like do not get into the holes. However, the tubes are readily cleaned by running hot water therethrough, or by passing a pipe cleaner therethrough. The apertures 60 can be cleaned with the point of a needle or the like, should this be necessary. The removability of the aerator tubes is desirable, in that it affords complete cleaning of both the beater per se, and the aerator tubes. Furthermore, it allows existing food mixers to be converted without difficulty. As will be understood, the principles of the invention readily can be applied to food mixers and the like with internal bores in specially designed beaters, rather than added on to conventional beaters.

The specific examples of the invention as herein shown and described are for illustrative purposes only. Various changes in structure will no doubt occur to those skilled in the art, and are to be understoood as forming a part of this invention insofar as they fall within the spirit and scope of the appended claims.

The invention is claimed as follows:

1. An aerating agitating rotary beater apparatus comprising frame means, rotary drive means rotatably supported by said frame means, rotary beater blade means rotatably supported by said frame means for agitating a quantity of liquid in a container, said beater blade means being partly within said liquid and partly extending above said liquid, at least a part of said frame means and said rotary drive means being disposed above said liquid, rotary transmission means disposed above said liquid and drivingly interconnecting said rotary drive means and said beater blade means for rotatably driving said beater blade means in response to rotation of said rotary drive means, aspirator tube means having intake opening means adjacent one end and a plurality of relatively small aspirator openings spaced along said tube means, and means on said beater means detachably securing said aspirator tube means thereto with said intake opening means disposed above said liquid and at least some of said aspirator openings disposed below said liquid to aspirate air thereinto upon rotation of said beater means, said tube means being detachable from said beater means for cleaning or replacement.

2. A beater apparatus as set forth in claim 1 and further including a plurality of dimples in said aspirator tube means respectively surrounding at least some of said aspirator openings.

3. A beater apparatus as set forth in claim 1 wherein the means on the beater blade means detachably securing the aspirator tube means thereto comprises vertically spaced means securing the tube means at a lower position within said liquid and at an upper position above said liquid, said tube means being open at the end within said liquid, and wherein the lower securing means comprises means projecting from said beater blade means and received in the end opening in said tube means within said liquid.

4. A beater apparatus as set forth in claim 3 wherein the beater means are made of sheet metal and the projecting means comprises means struck out of said beater blade means.

5. A an aerating agitating rotary beater apparatus comprising frame means, handle means on said frame means adjacent the top thereof for holding and supporting said apparatus by one hand of a user, crank means rotatably carried by said frame means and adapted to be rotated by the other hand of the user, rotary beater blade means rotatably supported by said frame means and disposed below said handle means and adapted to beat a quantity of liquid in a container, said beater blade means being partly within said liquid and partly extending above said liquid, rotary drive means rotatably mounted on said frame means above said liquid and drivingly interconnecting said crank means and said beater blade means for rotatably driving said beater blade means in response to manual rotation of said crank means, aspirator tube means having intake opening means adjacent one end and a plurality of relatively small aspirator openings spaced along said tube means, and means on said beater blade means detachably securing said aspirator tube means thereto with said intake opening means disposed above said liquid and at least some of said aspirator openings disposed within said liquid to aspirate air thereinto upon rotation of said beater blade means, said tube means being detachable from said beater blade means for cleaning or replacement.

6. A beater apparatus as set forth in claim 5 wherein the beater blade means comprises a plurality of beater blades, wherein the aspirator tube means comprises a plurality of tubes each open at both ends, each tube having a plurality of dimples therein each of which surrounds an aspirator opening, and wherein the means detachably securing the aspirator tubes to the beater blades comprises means projecting from said beater blades into the open ends of the respective tubes within the liquid and further comprises means securing the tubes to the blades adjacent the opposite ends thereof above said liquid.

References Cited in the file of this patent

UNITED STATES PATENTS

| | | |
|---|---|---|
| 655,871 | Johnson | Aug. 14, 1900 |
| 950,152 | Gaar | Feb. 22, 1910 |
| 1,579,355 | Greenwalt | Apr. 26, 1926 |
| 2,044,331 | Rogers | June 16, 1936 |